United States Patent
Noguchi et al.

(10) Patent No.: US 9,873,344 B2
(45) Date of Patent: Jan. 23, 2018

(54) NON-CONTACT POWER SUPPLIED ELECTRIC VEHICLE AND NON-CONTACT POWER SUPPLYING METHOD

(71) Applicant: HONDA MOTOR CO., LTD., Tokyo (JP)

(72) Inventors: Junya Noguchi, Wako (JP); Takashi Yanagiura, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 39 days.

(21) Appl. No.: 15/180,465

(22) Filed: Jun. 13, 2016

(65) Prior Publication Data

US 2016/0368386 A1  Dec. 22, 2016

(30) Foreign Application Priority Data

Jun. 16, 2015 (JP) ................................ 2015-120900

(51) Int. Cl.
*H02J 7/16* (2006.01)
*B60L 11/18* (2006.01)
*H02J 50/20* (2016.01)

(52) U.S. Cl.
CPC ......... *B60L 11/182* (2013.01); *B60L 11/1809* (2013.01); *B60L 11/1829* (2013.01); *B60L 11/1844* (2013.01); *H02J 50/20* (2016.02); *Y02T 10/7005* (2013.01); *Y02T 10/7241* (2013.01); *Y02T 90/16* (2013.01)

(58) Field of Classification Search
CPC ..... B60L 11/182; B60L 11/1844; H02J 50/20; Y02T 10/7241
USPC .......................... 320/104, 108, 155; 307/9.1
See application file for complete search history.

(56) References Cited

U.S. PATENT DOCUMENTS

| | | | |
|---|---|---|---|
| 2014/0008969 A1 | 1/2014 | Kanahara et al. | |
| 2014/0035358 A1* | 2/2014 | Ichikawa | H04B 5/0037 307/9.1 |
| 2014/0103865 A1* | 4/2014 | Van Wiemeersch | H02J 17/00 320/108 |

FOREIGN PATENT DOCUMENTS

| | | |
|---|---|---|
| JP | 2014-14225 A | 1/2014 |
| JP | 2014-124003 A | 7/2014 |
| WO | 2015/068476 A1 | 5/2015 |

* cited by examiner

*Primary Examiner* — Edward Tso
*Assistant Examiner* — Aaron Piggush
(74) *Attorney, Agent, or Firm* — Westerman, Hattori, Daniels & Adrian, LLP (57) ABSTRACT

In a non-contact power supplied electric vehicle or a non-contact power supplying method, when a request for starting non-contact supply of power is made, if it is determined that interference occurs between a charging frequency or a higher harmonic component thereof and a radio frequency, the charging frequency is changed to a frequency that is capable of avoiding the interference. Non-contact supply of power is allowed to be started under a condition in which the charging frequency has been changed to a frequency that is capable of avoiding the interference.

5 Claims, 5 Drawing Sheets

NON-CONTACT POWER SUPPLIED ELECTRIC VEHICLE AND NON-CONTACT POWER SUPPLYING METHOD

CROSS-REFERENCE TO RELATED APPLICATION

This application is based upon and claims the benefit of priority from Japanese Patent Application No. 2015-120900 filed on Jun. 16, 2015, the contents of which are incorporated herein by reference.

BACKGROUND OF THE INVENTION

Field of the Invention

The present invention relates to a non-contact power supplied electric vehicle to which electrical power is supplied in a non-contact manner from an external power supplying device, as well as to a non-contact power supplying method for such an electric vehicle.

Description of the Related Art

Japanese Laid-Open. Patent Publication No. 2014-124003 (hereinafter referred to as "JP2014-124003A") has the object of providing a non-contact charging device for a vehicle, in which it is possible to suppress the occurrence of radio noise, and to prevent a radio broadcast from becoming inaudible (see paragraph [0005], abstract). In order to achieve this object, according to JP2014-124003A (abstract), a charging frequency changing unit 7 is provided, which enables the charging frequency of the charging power to be changed arbitrarily by an operation of a vehicle occupant, when a device 5 that is carried into the vehicle is being charged with a charging coil. In the case that radio noise is generated, such radio noise is avoided by the vehicle occupant arbitrarily changing the charging frequency.

SUMMARY OF THE INVENTION

As discussed above, according to JP2014-124003A, in the case that radio noise is generated, such radio noise is avoided by the vehicle occupant arbitrarily changing the charging frequency (abstract). However, since the charging frequency is set by manual operations of the vehicle occupant, the vehicle occupant may become annoyed by such operations.

The present invention has been devised taking into consideration the aforementioned problems, and has the object of providing a non-contact power supplied electric vehicle and a non-contact power supplying method for such an electric vehicle, which is capable of reducing annoyance due to operations when non-contact supply of power is carried out.

A non-contact power supplied electric vehicle according to the present invention includes:

an electrical storage device;

a power receiving unit configured to receive electrical power for charging the electrical storage device, in a non-contact manner from an external power supplying device;

a frequency adjusting unit configured to adjust a charging frequency during non-contact supply of power;

a power supply control unit configured to control the non-contact supply of power;

a radio; and a radio state determining unit configured to determine an operating state of the radio;

wherein, when a request for starting non-contact supply of power is made, if it is determined that interference occurs between the charging frequency or a higher harmonic component thereof and a radio frequency, the frequency adjusting unit changes the charging frequency to a frequency that is capable of avoiding the interference; and the power supply control unit allows the non-contact supply of power to be started under a condition in which the charging frequency has been changed to the frequency that is capable of avoiding the interference.

According to the present invention, the frequency adjusting unit adjusts the charging frequency to a frequency that is capable of avoiding interference between the charging frequency or a higher harmonic component thereof and the radio frequency. Therefore, the need for the user of the electric vehicle or the radio to, adjust the charging frequency is eliminated, and the annoyance due to such an adjusting operation can be reduced.

Further, according to the present invention, even if a request to start non-contact supply of power is made, in the case that interference occurs between the charging frequency or a higher harmonic component thereof and the radio frequency, the non-contact supply of power is started under a condition in which the charging frequency has been changed to a frequency at which interference does not occur between the charging frequency or a higher harmonic component thereof and the radio frequency. Therefore, it is possible to listen to the radio even during non-contact supply of power, and by suppressing fluctuations of the charging frequency during non-contact supply of power, it is possible for electrical power to be supplied with stable efficiency.

The electric vehicle may further be equipped with a current position detecting unit configured to detect a current position of the electric vehicle. Further, the frequency adjusting unit may determine whether or not the radio frequency, which is received during a time that non-contact supply of power is not implemented, including during a time of traveling of the electric vehicle, resides within a band in which the charging frequency is changed. In this case, if the radio frequency is determined to reside within the band, the frequency adjusting unit may store, in a storage unit, storage information including the radio frequency and the current position, and when the storage information exists at a time that a request for starting non-contact supply of power is made, may set the charging frequency, based on the storage information.

Owing to this feature, since the charging frequency is set based on storage information that was stored beforehand, the time period from the request to start the non-contact supply of power until the conditions for allowing the non-contact supply of power are satisfied is shortened, whereby it becomes possible to enhance user comfort or to increase the marketability of the electric vehicle. In addition, even in the case of going to a location where the frequency of the radio broadcast changes due to long distance driving and charging is performed at such a location, it is possible for the driver to listen, to the radio without recognizing the change in the charging frequency.

The frequency adjusting unit may change the charging frequency only if the radio is in an on state and if it is determined that interference occurs between the charging frequency or a higher harmonic component thereof and the radio frequency. Owing thereto, by performing the change in the charging frequency only when necessary, the computational load can be reduced, and it is possible to shorten the period from the time that the request for non-contact supply of power is made until supply of power is started.

The frequency adjusting unit may change the charging frequency to the frequency that is capable of avoiding the interference, only in the case that a reception intensity of radio waves received by a receiver of the radio is higher than a predetermined threshold. Consequently, even in the case that interference numerically occurs between a charging frequency or a higher harmonic component thereof and the radio frequency, if the reception intensity of radio waves is low, it is still possible for the charging frequency to be used. Owing thereto, by performing the change in the charging frequency only when necessary, the computational load can be reduced, and together therewith, the range of options for the charging frequency can be enlarged, whereby it is possible to improve the charging efficiency.

A non-contact power supplying method according to the present invention, for carrying out supply of electrical power in a non-contact manner between an external device and an electric vehicle having a radio, includes the steps of:

when a request for starting non-contact supply of power is made, in the electric vehicle or the external device, determining whether or not interference occurs mutually between a charging frequency or a higher harmonic component thereof and a radio frequency, based on the charging frequency and the radio frequency;

if it is determined that the interference occurs, in the electric vehicle or the external device, changing the charging frequency to a frequency that is capable of avoiding the interference; and in the electric vehicle or the external device, starting non-contact supply of power, under a condition in which the charging frequency has been changed to the frequency that is capable of avoiding the interference.

According to the present invention, it is possible to reduce annoyance due to operations when non-contact supply of power is carried out.

The above and other objects features and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A. Embodiment

A1. Configuration

A1-1. Overall Configuration

Figure 1:
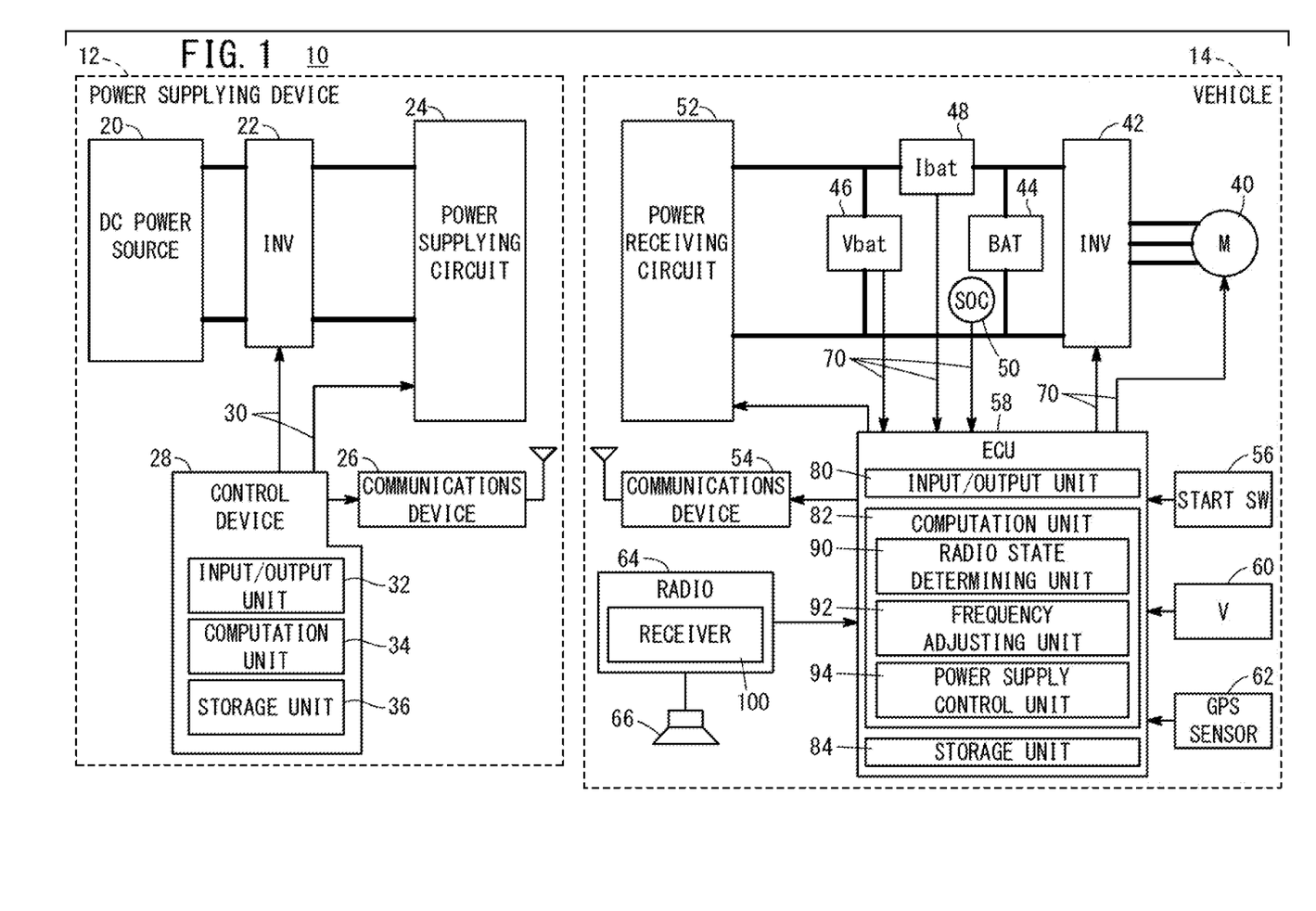
FIG. 1 is an outline schematic view of a non-contact power transmission system including an electric vehicle according to an embodiment of the present invention.

FIG. 1 is an outline schematic view of a non-contact power transmission system 10 (hereinafter also referred to as a "system 10") including an electric vehicle 14 according to an embodiment of the present invention. As shown in FIG. 1, the system 10 includes, in addition to the electric vehicle 14 (hereinafter also referred to as a "vehicle 14"), an external power supplying device 12 (hereinafter also referred to as a "power supplying device 12").

A1-2. External Power Supplying Device 12

The power supplying device 12 is an external device for supplying electrical power with respect to the vehicle 14, and is arranged, for example, in a parking lot. As shown in FIG. 1, the power supplying device 12 includes a DC power source 20, a power transmitting inverter 22 (hereinafter also referred to as an "inverter 22"), a power supplying circuit 24, a communications device 26 (hereinafter also referred to as a "transmission side communications device 26"), and a power supply control device 28 (hereinafter also referred to as a "control device 28"). Instead of the DC power source 20 and the inverter 22, an AC power source may be used.

The inverter 22 converts the DC electric current from the DC power source 20 into an AC electric current, and outputs the same to the power supplying circuit 24. The power supplying circuit 24 outputs electrical power from the inverter 22 to the vehicle 14. The communications device 26 is used for wireless communications with the vehicle 14. As for the detailed configurations of the inverter 22 and the power supplying circuit 24, for example, the configurations disclosed in FIG. 3 of International Publication No. WO 2015/068476 (hereinafter referred to as "WO2015/068476A1") can be used.

The control device 28 controls the inverter 22 and the power supplying circuit 24 through signal lines 30 (see FIG. 1). At this time, the control device 28 carries out communications with the vehicle 14 through the communications device 26. The control device 28 includes an input/output unit 32 that serves as an input/output interface, a computation unit 34 that performs various calculations, and a storage unit 36 in which there are stored programs and data used by the computation unit 34.

A1-3. Vehicle 14

A1-3-1. Overall Configuration

The vehicle 14 is a so-called electric vehicle having a travel motor 40 (hereinafter also referred to as a "motor 40") as a drive source. As will be discussed later, the vehicle 14 may be an electric vehicle such as a hybrid vehicle or the like having an engine in addition to the motor 40.

In addition to the travel motor 40, the vehicle 14 includes a motor driving inverter 42 (hereinafter also referred to as an "inverter 42"), a battery 44 (electrical storage device), a voltage sensor 46, a current sensor 48, an SOC (state of charge) sensor 50, a power receiving circuit 52, a communications device 54 (hereinafter also referred to as a "vehicle side communications device 54"), a charging start switch 56, and an electronic control unit 58 (hereinafter referred to as an "ECU 58"). A non-illustrated DC/DC converter may be disposed between the inverter 42 and the battery 44 for transforming the output voltage of the battery 44.

Furthermore, the vehicle 14 includes a vehicle velocity sensor 60, a global positioning system sensor 62 (hereinafter referred to as a "GPS sensor 62"), a radio 64, and a speaker 66.

A1-3-2. Motor 40 and Inverter 42

The motor 40 of the present embodiment is a three-phase AC brushless type of motor. The motor 40 generates a driving force based on the electrical power supplied from the battery 44, and by the driving force, the vehicle wheels (not shown) are rotated through a transmission (not shown). Further, the motor 40 outputs to the battery 44 or the like an electrical power (regenerative electrical power Prsg) [W] that is produced by performing electrical power regeneration.

The inverter 42 includes a three-phase bridge type configuration, and carries out DC to AC conversion. More specifically, the inverter 42 converts the DC electric current to a three-phase AC electric current and supplies the same to the motor 40, and on the other hand, accompanying a regenerative operation, supplies to the battery 44 or the like a DC electric current after AC to DC conversion thereof.

A1-3-3. Battery 44, Voltage Sensor 46, Current Sensor 48, and SOC Sensor 50

The battery 44 is an electrical storage device (energy storage) containing a plurality of battery cells, and for example, can utilize a lithium ion secondary battery, a nickel hydrogen secondary battery, or the like. According to the present embodiment, a lithium ion secondary battery is used.

The voltage sensor 46 detects an input voltage (hereinafter referred to as a "battery input voltage Vbat" or a "voltage Vbat") [V] that is input to the battery 44 from the power receiving circuit 52. The current sensor 48 detects an input electric current (hereinafter referred to as a "battery input electric current Ibat" or a "current Ibat") [A] that is input to the battery 44 from the power receiving circuit 52. The SOC sensor 50 detects a remaining capacity (SOC: State of Charge) [%] of the battery 44.

A1-3-4. Power Receiving Circuit 52

The power receiving circuit 52 (power receiving unit) receives electrical power from the power supplying device 12 and charges the battery 44. As for the detailed configuration of the power receiving circuit 52, for example, the configuration disclosed in FIG. 3 of WO2015/068476A1 can be used.

A1-3-5. Communications Device 54

The communications device 54 is used for wireless communications with the power supplying device 12.

A1-3-6. Charging Start Switch 56

The charging start switch 56 (hereinafter also referred to as a "start switch 56") accepts an input from the user to request, with respect to the ECU 58, that power be supplied to the vehicle 14 from the power supplying device 12.

A1-3-7. ECU 58

Through signal lines 70 (see FIG. 1), the ECU 58 controls the motor 40, the inverter 42, the battery 44, and the power receiving circuit 52. Further, by communicating with the power supplying device 12 through the communications device 54, the ECU 58 controls electrical power transmission (supply of electrical power) from the power supplying device 12. At this time, the ECU 58 uses the various sensor detection values from the voltage sensor 46, the current sensor 48, and the SOC sensor 50, etc.

The ECU 58 includes an input/output unit 80 that serves as an input/output interface, a computation unit 82 that performs various calculations, and a storage unit 84 in which there are stored programs and data used by the computation unit 82. Further, the ECU 58 need not be made up from a single ECU, but can be constituted from a plurality of ECUs provided respectively for the motor 40, the inverter 42, the battery 44, and the power receiving circuit 52.

The computation unit 82 includes a radio state determining unit 90, a frequency adjusting unit 92, and a power supply control unit 94. The radio state determining unit 90 determines the state of the radio 64. As states of the radio 64, there are included, for example, an on/off state, and the radio frequency (or channel) during reception. The frequency adjusting unit 92 adjusts (or sets) the charging frequency fchg [Hz] responsive to the state of the radio 64, etc. The power supply control unit 94 communicates with the power supplying device 12, and controls the supply of power from the power supplying device 12. At this time, the power supply control unit 94 uses the charging frequency fchg that was adjusted by the frequency adjusting unit 92.

A1-3-8. Vehicle Velocity Sensor 60 and GPS Sensor 62

The vehicle velocity sensor 60 detects the vehicle velocity V [km/h] of the vehicle 14. The GPS sensor 62 (current position detecting unit) detects the current position Pc of the vehicle 14. In the present embodiment, although it is assumed that the vehicle, velocity sensor 60 and the GPS sensor 62 are mounted (or fixed at all times) in the vehicle 14, they may be constituted from a device such as a smart phone or the like, which is capable of being carried into the vehicle 14 from the exterior.

A1-3-9. Radio 64

The radio 64 of the present embodiment is capable of receiving AM broadcasts and FM broadcasts through a receiver 100. In the present embodiment, although it is assumed that the radio 64 is mounted (or fixed at all times) in the vehicle 14, it may be constituted from a device such as a smart phone or the like, which is capable of being carried into the vehicle 14 from the exterior.

A2. Controls for Preparation and Implementation of Charging

A2-1. Outline

Next, a description will be given concerning controls for preparation and implementation of charging as implemented by the ECU 58 of the vehicle 14 according to the present embodiment. The controls for preparation and implementation of charging include preparation for charging (step S2, etc., of FIG. 2, to be described later) and implementation of charging (step S4, to be described later) from the power supplying device 12.

Figure 2:
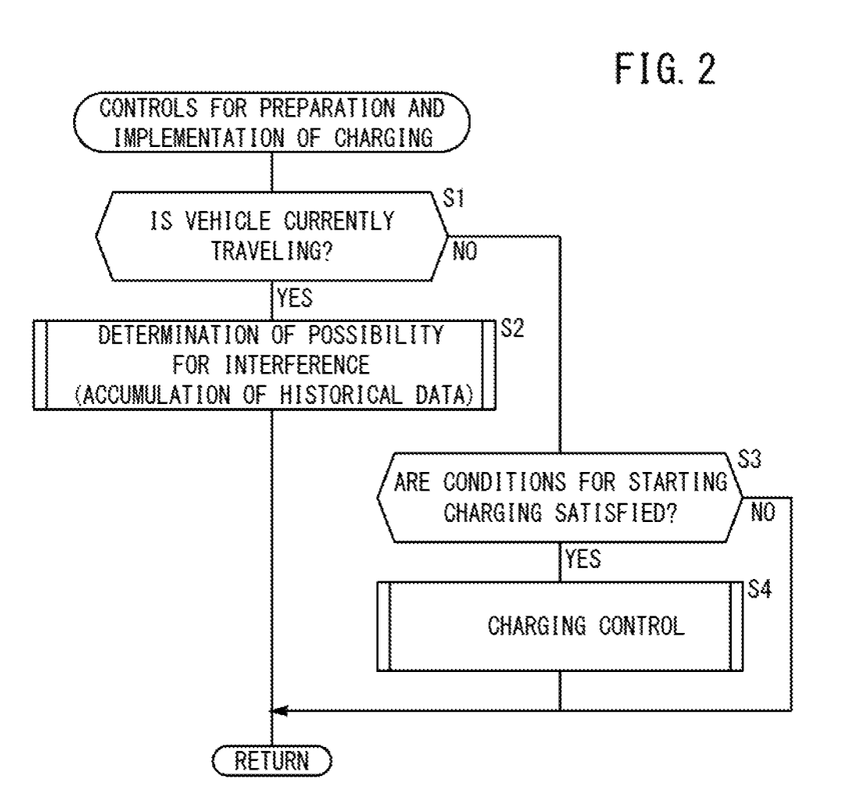
FIG. 2 is a flowchart of controls for preparation and implementation of charging according to the present embodiment.

FIG. 2 is a flowchart of controls for preparation and implementation of charging according to the present embodiment. In step S1, the ECU 58 determines whether or not the vehicle 14 is currently traveling. Such a judgment, for example, is carried out by comparing the vehicle velocity V from the vehicle velocity sensor 60 with a first vehicle velocity threshold (e.g., 0 km/h). If the vehicle 14 is currently traveling (step S1: YES), the process proceeds to step S2.

In step S2, the ECU 58 carries out a determination as to whether there is a possibility for interference between the charging frequency fchg and an AM frequency fam. The charging frequency fchg is a frequency [Hz] of the AC electric current during a time that the vehicle 14 is being charged from the external power supplying device 12. The AM frequency fam is a broadcast frequency [Hz] of a channel (hereinafter also referred to as a "radio channel") or a broadcasting station (hereinafter also referred to as a "radio station") that is capable of being selected or tuned to by the radio 64. As a result of the determination of the possibility for interference, the ECU 58 accumulates in the storage unit 84 historical data Dh (storage information) concerning the possibility for interference. Details of the determination of the possibility for interference will be described later with reference to FIGS. 3 and 4. As will be discussed later, it is possible for part of step S2 to be carried out prior to step S1.

Returning to step S1, if the vehicle 14 is not currently traveling (step S1: NO), then in step S3, the ECU 58 determines whether or not the conditions for starting charging are satisfied. Among the conditions for starting charging, there are included, for example, whether the charging start switch 56 has been pressed and whether the vehicle velocity V is zero [km/h].

If the conditions for starting charging are satisfied (step S3: YES), then in step S4, the ECU 58 implements a charging control for receiving the supplied electrical power from the power supplying device 12 (details to be described later with reference to FIG. 5). If the conditions for starting charging are not satisfied (step S3: NO), the present processing cycle is brought to an end, and after elapse of a predetermined time period, step S1 is carried out again.

A2-2. Determination of Possibility for Interference (Step S2 of FIG. 2

Figure 3:
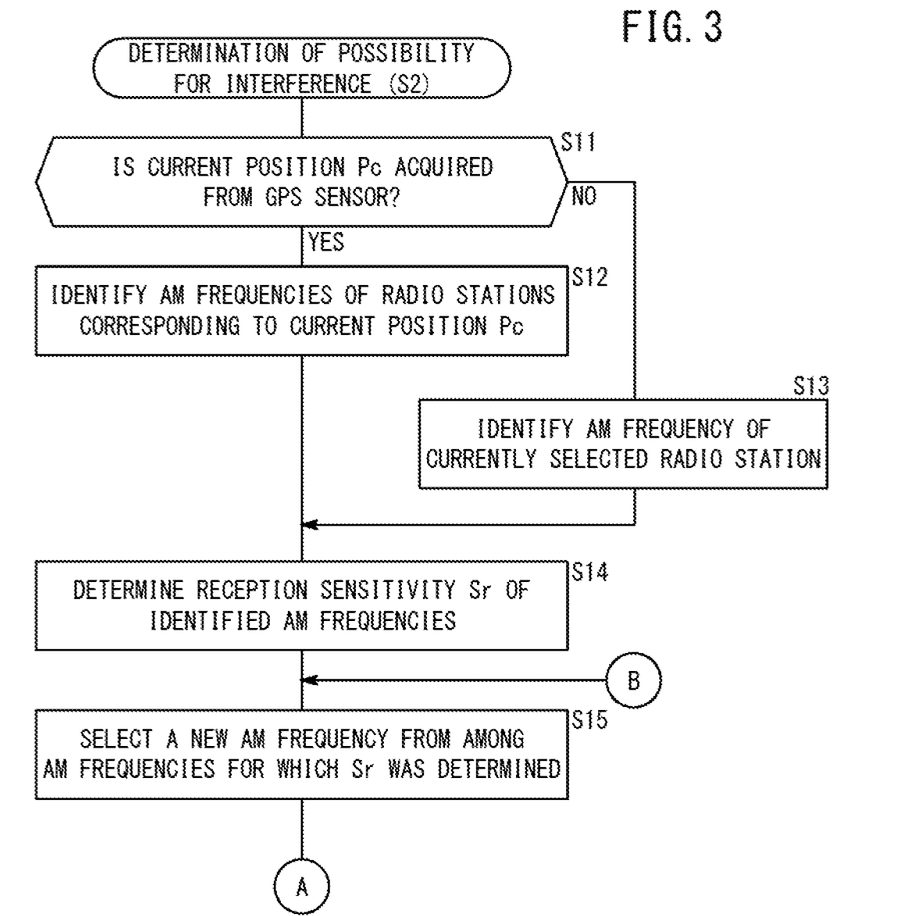
FIG. 3 is a first flowchart (details of step S2 of FIG. 2) for determining the possibility for interference according to the present embodiment.
Figure 4:
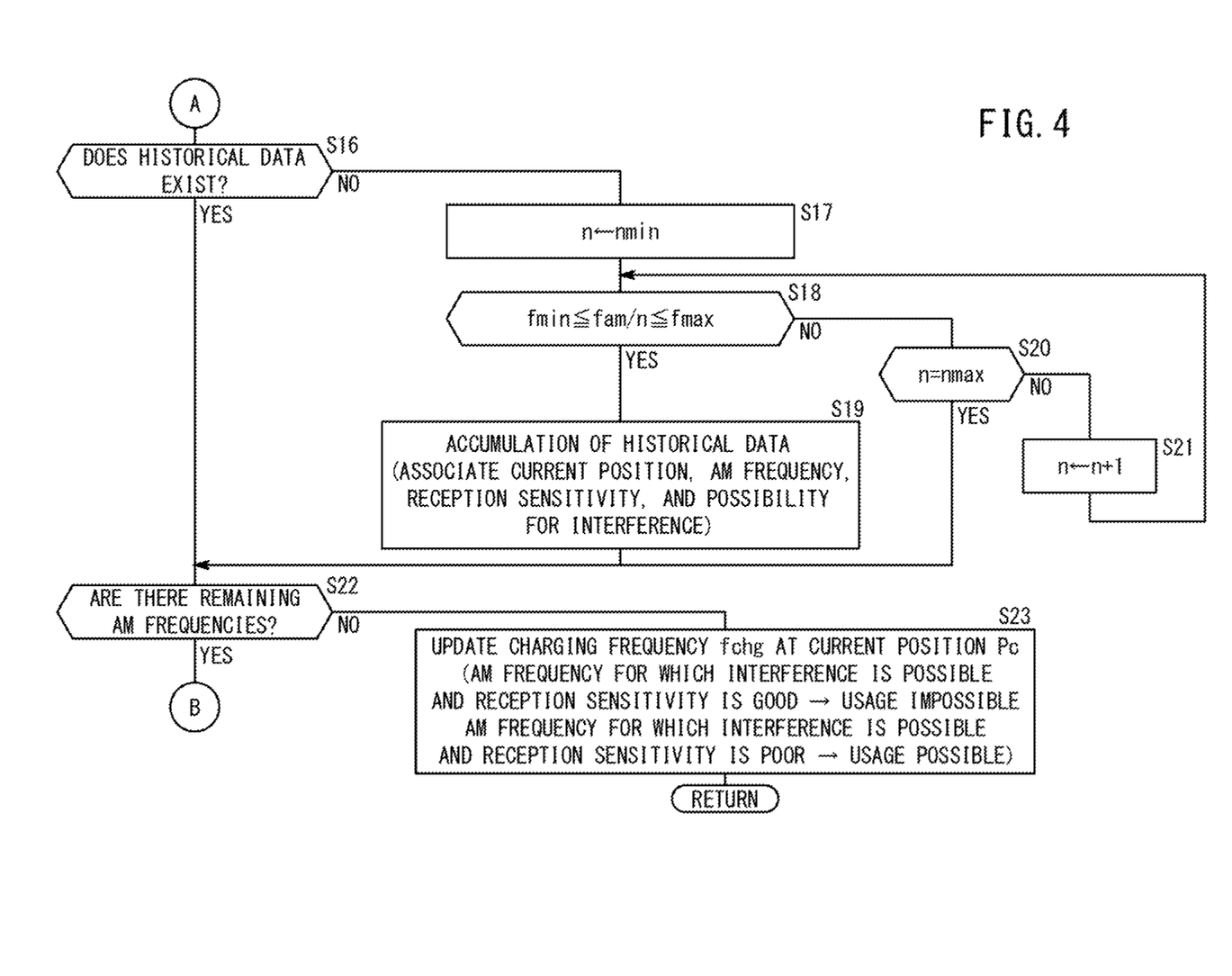
FIG. 4 is a second flowchart (details of step S2 of FIG. 2) for determining the possibility for interference according to the present embodiment.

FIGS. 3 and 4 are first and second flowcharts (details of step S2 of FIG. 2) for determining the possibility for interference according to the present embodiment. The processes of FIGS. 3 and 4 are carried out for each occurrence of a predetermined period. The predetermined period, for example, can be set in accordance with a traveling distance or time of the vehicle 14. Further, among the respective steps of FIGS. 3 and 4, steps S11 and S14 through S23 are implemented by the frequency adjusting unit 92, whereas steps S12 and S13 are implemented by the radio state determining unit 90 and the frequency adjusting unit 92.

In step S11 of FIG. 3, the ECU 58 determines whether or not the current position Pc of the vehicle 14 has been acquired from the GPS sensor 62. Stated otherwise, the ECU 58 determines whether or not the current position. Pc of the vehicle 14 is supplied from the GPS sensor 62.

If the current position Pc is acquired (step S11: YES), then in step S12, the ECU 58 identifies the AM frequencies fam of radio stations corresponding to the current position Pc. According to the present embodiment, AM frequencies fam of one or a plurality of radio stations, which serve as candidates for reception, are stored in the storage unit 84 for each of respective current positions Pc (or areas (current areas Ac) to which the current position belongs). Therefore, among the AM frequencies fam that are stored in the storage unit 84, the ECU 58 identifies all of such frequencies that correspond to the current position Pc (or the current area Ac).

Returning to step S11, if the current position Pc is not acquired (step S11: NO), then in step S13, the ECU 58 identifies the AM frequency fam of the radio station that is currently selected by the radio 64. In this instance, the phrase "currently selected" indicates a radio station that is currently being received (or listened to) in the case that the radio 64 is on and an AM broadcast is currently under selection. Further, if the radio 64 is off or a radio broadcast other than an AM broadcast (for example, an FM broadcast) is currently selected, the phrase "currently selected" indicates a radio station of the AM broadcast to be first received thereafter.

In the present embodiment, the radio station is limited to an AM broadcast. This is because, according to the present embodiment, it is assumed that the frequency band of the AM broadcast is of a value that is lower than the frequency band of an FM broadcast, and during the time that an FM broadcast is received, the present embodiment is premised on the fact that interference between the charging frequency fchg and the FM frequency does not occur. However, for example, in the case that the frequency band of the FM broadcast is set to a comparatively low value, in relation to the radio station of the FM broadcast, the same process steps as shown in FIG. 3 may be performed.

In step S14, the ECU 58 determines the reception sensitivity Sr in relation to one or all of a plurality of the AM frequencies fam that were identified in step S12 or step S13. More specifically, the ECU 58 sets an intensity threshold in relation to the reception intensity (amplitude) of radio waves, and by comparing the reception intensity and the intensity threshold, determines whether the reception sensitivity Sr is good or poor.

In step S15, the ECU 58 selects a new frequency from among the AM frequencies fam for which the reception sensitivity Sr thereof was determined. The term "new frequency" implies an AM frequency fam that has not undergone the determination of step S16 of FIG. 4, within the current computation period during which the process steps of FIGS. 3 and 4 are performed.

In step S16 of FIG. 4, the ECU 58 determines whether or not historical data Dh exists in the storage unit 84 concerning the AM frequency fam that was selected in step S15. In the case that such historical, data Dh exists (step S16: YES), the process proceeds to step S22 without updating the historical data Dh. In the case that such historical data Dh does not exist (step S16: NO), or stated otherwise, concerning the AM frequency fam for which there is no historical data Dh, the process proceeds to step S17.

In steps S17 through S21, it is determined whether or not a higher harmonic component of the charging frequency fchg and the AM frequency fam interfere mutually with each other, either theoretically or numerically. More specifically, it is determined whether, or not a quotient fam/n obtained by dividing the AM frequency fam by a variable n lies within a range of being greater than or equal to a minimum frequency fmin and less than or equal to a maximum frequency fmax of the charging frequency fchg.

The variable n is a natural number that is variable within a predetermined range. The range of the variable n is set to a range within which interference can occur between a higher harmonic component of the charging frequency fchg and the AM frequency fam. In the present embodiment, the AM frequency fam is set, for example, within a range of several hundreds of kHz to several thousands of kHz, whereas the charging frequency fchg is set, for example, within a range of several tens of kHz to several hundreds of kHz. Therefore, concerning the predetermined range of the variable n, the minimum value nmin and the maximum value nmax thereof are set, for example, from within a range of 5 to 100.

The minimum frequency fmin and the maximum frequency fmax of the charging frequency fchg are set, for example, taking into consideration the power supplying efficiency. The electrical power transmission of the present embodiment is of a magnetic resonance type, in which the power supplying efficiency is highest when the charging frequency fchg is equal to the resonant frequency, and the power supplying efficiency becomes lower as the charging frequency fchg moves away from the resonant frequency. The minimum frequency fmin and the maximum frequency fmax are set based on an allowable minimum value in relation to the power supplying efficiency.

When one looks to the specific process steps, in step S17, the ECU 58 assigns the minimum value nmin to the variable n. In the foregoing manner, the minimum value nmin is a minimum value within the predetermined range for the variable n, and is specified based on the current charging frequency fchg and a range within which the AM frequency fam can be taken.

In step S18, the ECU 58 determines whether or not the quotient fam/n, which was obtained by dividing the AM frequency fam (target frequency) that was selected in step S15 by the variable n, lies within a range of being greater than or equal to a minimum frequency fmin and less than or equal to a maximum frequency fmax.

If the quotient fam/n is greater than or equal to the minimum frequency fmin and less than or equal to the maximum frequency fmax (step S18: YES), a higher harmonic component of the charging frequency fchg may interfere with the AM frequency fam either theoretically or numerically.

In this case, in step S19, the ECU 58 associates the current position Pc (step S11), the AM frequency fam (step S15), the reception sensitivity Sr (step S14), and the possibility for interference to occur, and accumulates such information as the historical data Dh in the storage unit 84. Even if there is a possibility for interference to occur, in the case that the reception sensitivity Sr is low, the AM frequency fam is stored together with information indicative of the fact that there is a possibility for interference and that the reception sensitivity Sr is low. Further, in the case that the current position Pc could not be acquired in step S11 of FIG. 3 (step S11: NO), without being associated with the current position Pc, only the AM frequency fam, the reception sensitivity Sr, and the possibility for interference are associated with each other. After step S19, the process proceeds to step S22.

In step S18, if the quotient fam/n is not greater than or equal to the minimum frequency fmin, or is not less than or equal to the maximum frequency fmax (step S18: NO), then in step S20, the ECU 58 determines whether or not the value of the current variable n is equal to the maximum value nmax. In the foregoing manner, the maximum value nmax is a maximum value within the predetermined range for the variable n, and is specified based on the current charging frequency fchg and a range within which the AM frequency fam can be taken.

If the current value of the variable n is equal to the maximum value nmax (step S20: YES), then it is determined that the determination of step S18 is carried out for all the possible values for the variable n, and that a higher harmonic component of the charging frequency fchg does not interfere with the AM frequency fam. In this case, the process proceeds to step S22. If the current value of the variable n is not equal to the maximum value nmax (step S20: NO), then in step S21, the ECU 58 increments the variable n by 1, and returns to step S18.

In step S22, the ECU 58 determines whether or not there are any remaining AM frequencies fam. More specifically, the ECU 58 determines whether or not, from among the AM frequencies fam for which the reception sensitivity Sr thereof was judged in step S14, there are any AM frequencies fam for which the determination of step S16 has not yet been performed.

If there are any remaining AM frequencies fam (step S22: YES), the process returns to step S15 of FIG. 3. If there are not any remaining AM frequencies fam (step S22: NO), then in step S23, the ECU 58 updates (or stores) the charging frequency fchg. More specifically, the ECU 58 associates the current position Pc (or the current area Ac), the AM frequency fam, and the charging frequency fchg, and stores such information as a portion of the historical data Dh in the storage unit 84.

At this time, the charging frequency fchg is changed so as to avoid such AM frequencies fam that have a possibility for interference with the charging frequency fchg to occur and a good reception sensitivity Sr. On the other hand, as to AM frequencies that have a possibility for interference with the charging frequency fchg to occur but a poor reception sensitivity Sr, the charging frequency fchg is set without avoiding duplication with such AM frequencies fam.

Figure 5:
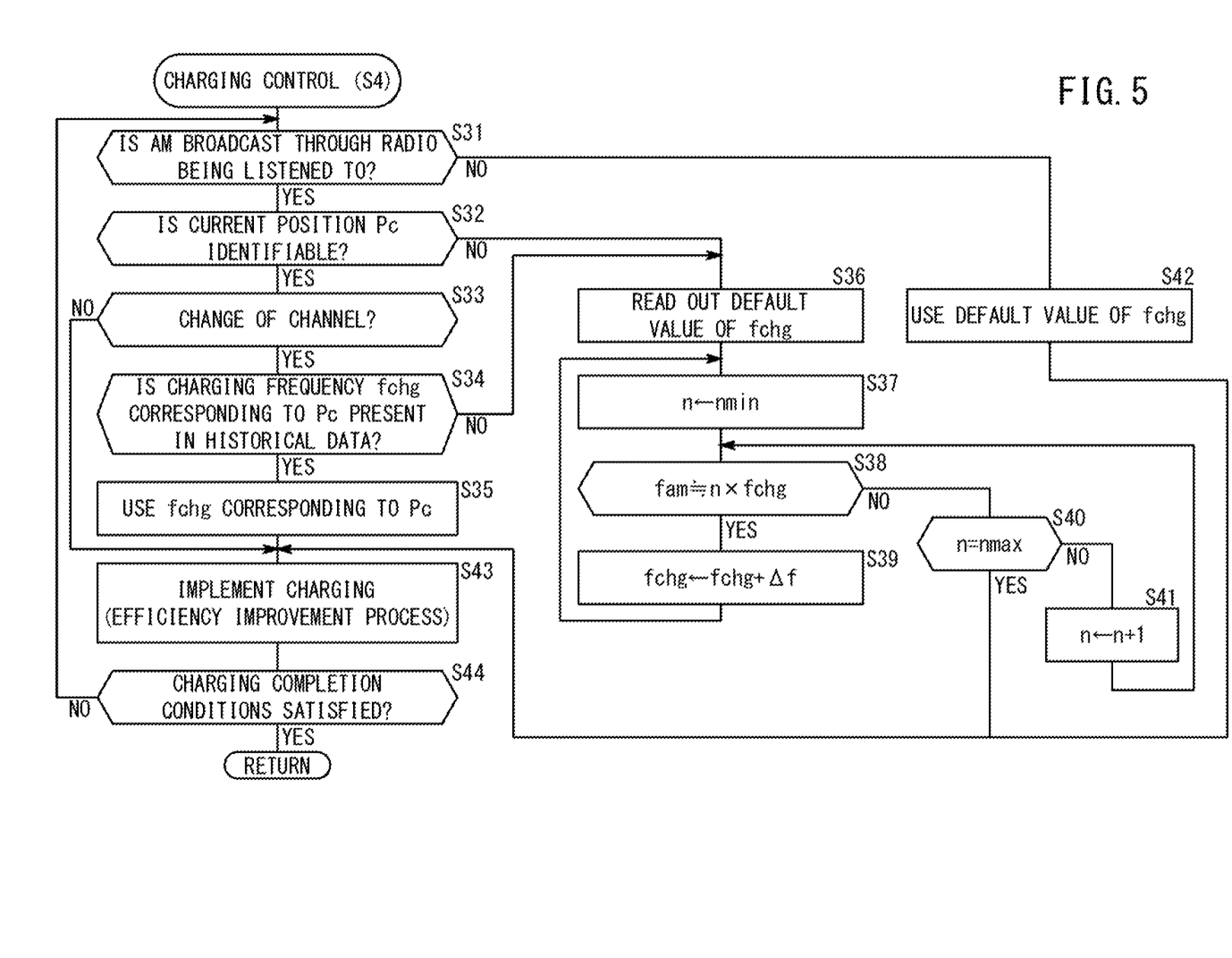
FIG. 5 is a flowchart (details of step S4 of FIG. 2) of a charging control according to the present embodiment.

It should be noted that, in step S23, although the charging frequency fchg is set (or changed) based on the current position Pc, the reception sensitivity Sr, and the possibility for interference, the process of step S23 can also be carried out in the charging control (see FIG. 5).

A2-3. Charging Control (Step S4 of FIG. 2)

FIG. 5 is a flowchart (details of step S4 of FIG. 2) of a charging control according to the present embodiment. The process of FIG. 5 is carried out for each occurrence of a predetermined period (e.g., for each of several milliseconds to several seconds). Further, among the respective steps of FIG. 5, steps S31 and S33 are implemented by the radio state determining unit 90, steps S32 and steps S34 through S42 are implemented by the frequency adjusting unit 92, and steps S43 and S44 are implemented by the power supply control unit 94.

In step S31, the ECU 58 determines whether or not an AM broadcast through the radio 64 is currently being listened to. If an AM broadcast is currently being listened to (step S31: YES), then in step S32, the ECU 58 determines whether or not the current position Pc of the vehicle 14 is capable of being identified through the GPS sensor 62. If the current position Pc can be identified (step S32: YES), then in step S33, the ECU 58 determines whether or not the channel of the radio 64 has been changed. This determination becomes YES immediately after the radio 64 is turned on.

If the channel has been changed (step S33: YES), then in step S34, the ECU 58 determines whether or not the charging frequency fchg corresponding to the current channel (AM frequency fam) and the current position Pc exists within the historical data Dh. In the case that such a charging frequency fchg exists (step S34: YES), then in step S35, the ECU 58 uses the charging frequency fchg corresponding to the current channel (AM frequency fam) and the current position Pc, and then the process proceeds to step S43. If the channel is not changed (step S33: NO), the process proceeds to step S43 without passing through steps S34 and S35.

If the current position Pc cannot be identified in step S32 (step S32: NO), or if a charging frequency fchg corresponding to the current position Pc does not exist within the historical data Dh in step S34 (step S34: NO), the process proceeds to step S36. In step S36, the ECU 58 reads out a default value for the charging frequency fchg (a resonant frequency or a value in the vicinity thereof).

In steps S37 through S41, the charging frequency fchg is set such that a higher harmonic component of the charging frequency fchg does not interfere with the AM frequency fam that is currently being received. More specifically, in step S37, the ECU 58 assigns the minimum value nmin to the variable n. The variable n and the minimum value nmin can be utilized in the same manner as in step S17 of FIG. 4.

In step S38, the ECU 58 determines whether or not the product of the variable n and the charging frequency fchg (n×fchg) is substantially equal to the AM frequency fam that is currently being received. Stated otherwise, the ECU 58 sets a lower side threshold and an upper side threshold based on the AM frequency fam that is currently being received. In addition, the ECU 58 determines whether or not the product of the variable n and the charging frequency fchg (n×fchg) is greater than or equal to the lower side threshold and less than or equal to the upper side threshold.

If the product n×fchg is substantially equal to the AM frequency fam that is currently being received (step S38: YES), there is a possibility (or a high possibility) for interference to occur between the AM frequency fam that is currently being received and the charging frequency fchg or a higher harmonic component thereof. In this case, in step S39, the ECU 58 sets a sum (fchg+Δf) obtained by adding the value Δf to the current charging frequency fchg as a new charging frequency fchg (or assigns the sum to the current charging frequency fchg). The value Δf is a value by which the charging frequency fchg is shifted in order to avoid interference, and for example, is set to any value within a range of a few kHz to several tens of kHz. After step S39, the process returns to step S37.

Returning to step S38, if the product n×fchg is not substantially equal to the AM frequency fam that is currently being received (step S38: NO), or stated otherwise, if the product n×fchg is less than the lower side threshold or greater than the upper side threshold, there is no possibility (or a low possibility) for interference to occur between the AM frequency fam that is currently being received and the charging frequency fchg or a higher harmonic component thereof. In this case, the process proceeds to step S40.

In step S40, it is determined whether or not the current variable n is equal to the maximum value nmax. The maximum variable nmax is the same as that used in step S20 of FIG. 4.

If the current value of the variable n is equal to the maximum value nmax (step S40: YES), then it is determined that the determination of step S38 is carried out for all the possible values for the variable n, and further that the charging frequency fchg and a higher harmonic component thereof do not interfere with the AM frequency fam. In this case, the process proceeds to step S43. If the current value of the variable n is not equal to the maximum value nmax (step S40: NO), then in step S41, the ECU 58 increments the variable n by 1, and the process returns to step S38.

Returning to step S31 if an AM broadcast is not currently being listened to (step S31: NO), then in step S42, the ECU 58 uses the default value for the charging frequency fchg (a resonant frequency or a value in the vicinity thereof).

If the determination of step S33 is NO, or after step S35, or if the determination of step S40 is YES, or after step S42, the process proceeds to step S43.

In step S43, the ECU 58 implements charging of the battery 44 by the electrical power from the power supplying device 12. More specifically, the ECU 58 notifies the power supplying device 12 of the charging frequency fchg that was set in step S35, or steps S36 through S41, or step S42. Having received the notification, the power supplying device 12 supplies electrical power by controlling the inverter 22 at the charging frequency fchg that was notified from the ECU 58. In the vehicle 14, the battery 44 is charged by the electrical power from the power supplying device 12.

According to the present embodiment, although a magnetic resonance technique Is used as the non-contact supply of power, another type of supply of power may be used. Further, during non-contact power supplying, the ECU 58 monitors the power transmission efficiency using detection values from the voltage sensor 46 and the current sensor 48. In addition, the ECU 58 may carry out an efficiency improving process that changes the charging frequency fchg so as to improve the power transmission efficiency. However, in this case, a limited range is set with respect to the charging frequency fchg, such that a higher harmonic component of the charging frequency fchg does not interfere with the AM frequency Lam.

In step S44, the ECU 58 determines whether or not a charging completion condition has been satisfied. As such a charging completion condition, there can be used, for example, that the SOC of the battery 44, which is detected by the SOC sensor 50, has become a target value (e.g., a value indicative of full charging). Alternatively, the ECU 58 may use as the charging completion condition that the charging start switch 56 has been turned off. If the charging completion condition has not been satisfied (step S44: NO), the process returns to step S31. If the charging completion condition has been satisfied (step S44: YES), then the current charging control process is brought to an end.

A3. Advantages of the Present Embodiment

As has been described above, according to the present embodiment, the frequency adjusting unit 92 adjusts the charging frequency fchg to a frequency that is capable of avoiding interference between a higher harmonic component of the charging frequency fchg and the AM frequency fam (radio frequency) (steps S17 through S21 and step S23 of FIG. 4, and steps S32 through S41 of FIG. 5). Therefore, the need for the user of the electric vehicle 14 or the radio 64 to adjust the charging frequency fchg is eliminated, and the annoyance due to such an adjusting operation can be reduced.

Further, according to the present embodiment, even if a request for starting non-contact supply of power is made (step S3 of FIG. 2: YES), in the case that interference occurs between a higher harmonic component of the charging frequency fchg and the AM frequency fam (radio frequency), the non-contact supply of power is not started until the charging frequency fchg is changed to a frequency for which interference does not occur between the higher harmonic component of the charging frequency fchg and the AM frequency fam (steps S32 through S41, and S43 of FIG. 5). Therefore, it is possible to listen to the radio 64 even during non-contact supply of power and by suppressing fluctuations of the charging frequency fchg during non-contact supply of power, it is possible for power to be supplied with stable efficiency.

In the present embodiment, the electric vehicle 14 is equipped with the GPS sensor 62 (current position detecting unit) that detects a current position Pc of the vehicle 14 (see FIG. 1). The frequency adjusting unit 92 determines whether or not the AM frequency fam (radio frequency), which is received during a time that non-contact supply of power is not implemented, including during a time of traveling of the electric vehicle 14, resides within a band (fmin≤fam/n≤fmax) in which the charging frequency fchg is changed (step S18 of FIG. 4). If it is determined that the AM frequency fam resides within the band, the frequency adjusting unit 92 stores in the storage unit 84 the historical data Dh (storage information) including the AM frequency fam and the current position Pc (step S19). Furthermore, when the historical data Dh exists (step S34 of FIG. 5: YES) at a time that a request to start non-contact supply of power is made (step S3 of FIG. 2; YES), the frequency adjusting unit 92 sets the charging frequency fchg on the basis of the historical data Dh (step S35).

Owing to this feature, since the charging frequency fchg is set based on historical data Dh that was stored beforehand, the time period from the request to start the non-contact supply of power until the conditions for allowing the non-contact supply of power are satisfied is shortened, whereby it becomes possible to enhance user comfort or to increase the marketability of the vehicle 14. In addition, even in the case of going to a location where the frequency of the radio broadcast changes due to long distance driving and charging is performed at such a location, it is possible for the driver to listen to the radio 64 without recognizing the change in the charging frequency fchg.

In the present embodiment, the frequency adjusting unit 92 changes the charging frequency fchg only if the radio 64 is in an on state and if it is determined that interference occurs between a higher harmonic component of the charging frequency fchg and the AM frequency fam (radio frequency) (steps S19 and S23 of FIG. 4, steps S36 through S41 of FIG. 5). Owing thereto, by performing the change in the charging frequency fchg only when necessary, the computational load of the ECU 58 can be reduced, and it is possible to shorten the period from the time that the request for non-contact supply of power is made until supply of power is started.

In the present embodiment, the frequency adjusting unit 92 changes the charging frequency fchg to a frequency that is capable of avoiding interference, only in the case that the reception intensity (reception sensitivity Sr) of radio waves received by a receiver 100 of the radio 64 is higher than a predetermined threshold (step S23 of FIG. 4). Consequently, at a numerical value of a certain frequency, even if interference occurs between a higher harmonic component of the charging frequency fchg and the AM frequency fam (radio frequency), if the reception intensity (reception sensitivity Sr) of radio waves is low, it is still possible for the charging frequency fchg to be used. Owing thereto, by performing the change in the charging frequency fchg only when necessary, the computational load can be reduced, and together therewith, the range of options for the charging frequency fchg can be enlarged, whereby it is possible to improve the charging efficiency.

B. Modifications

The present invention is not limited to the embodiment described above, and it is a matter of course that various configurations may be adopted therein based on the disclosed content of the present specification. For example, the following configurations can be adopted.

B1. Object of Application

According to the above-described embodiment, the non-contact power, transmission system 10 is used for supplying power to (for charging) a vehicle 14, which is an electric vehicle (FIG. 1). However, the system 10 may be used in other types of electric vehicles (a hybrid vehicle, a fuel cell vehicle, or the like). Alternatively, the system 10 is not limited to being used in a vehicle 14, and can be used in other mobile objects (ships and aircraft, etc.) to which there is a need for electrical power to be supplied. Alternatively, the system 10 may be applied to electrical facilities or electrical devices (robots, household appliances, or the like) to which there is a need for electrical power to be supplied.

B2. Configuration

According to the above-described embodiment, although a battery 44 is utilized as the electrical storage device (FIG. 1), other, electrical storage devices apart therefrom (for example, a capacitor) may be used.

B3. Determination of Possibility for Interference (Step S2 of FIG. 2, FIGS. 3 and 4)

According to the above-described embodiment, the accumulation of historical data Dh (steps S19 and S23 of FIG. 4) is performed only at times that the vehicle 14 is traveling (step S1 of FIG. 2: YES). However, for example, from the standpoint of utilizing the reception sensitivity Sr of the radio frequency (AM frequency fam, etc.) at the current position Pc of the vehicle 14, the invention is not limited to this feature, and the historical data Dh may be accumulated during times that the vehicle 14 is parked (for example, at a timing at which an accessory (ACC) state or an ON state is selected by a non-illustrated starting switch).

According to the above-described embodiment, the accumulation of historical data Dh (steps S19 and step S23 of FIG. 4) is carried out at each of predetermined periods over an entire period that the vehicle 14 is traveling (step S1 of FIG. 2: YES). However, for example, from the standpoint of suppressing excessive accumulation of historical data Dh, the invention is not necessarily limited to this feature. For example, it is possible for historical data Dh to be accumulated only during traveling in a state in which the vehicle velocity V falls below a second vehicle velocity threshold (e.g., any value from within a range of 20 to 40 km/h). According to the above-described embodiment, non-contact supply of power is carried out in a state in which the vehicle 14 is stopped or parked (see FIG. 2). Therefore, in the case that the vehicle velocity V is above the second vehicle velocity threshold, the possibility for carrying out non-contact supply of power is expected to be low. In such a case, the accumulation of historical data Dh is restricted, whereby it becomes possible to lighten the computational burden of the computation unit 82 or to conserve the capacity of the storage unit 84.

According to the above-described embodiment, the accumulation of historical data Dh is made possible (steps S19 and S23 of FIG. 4) also in the case that the current position Pc of the vehicle 14 cannot be acquired (step S11 of FIG. 3: NO). However, in the case that the current position Pc cannot be acquired, the accumulation of historical data Dh may be disabled.

According to the above-described embodiment, in the case that historical data Dh in relation to the current position Pc already exists (step S16 of FIG. 4: YES), the accumulation or updating of further historical data Dh is not performed. However, for example, from the standpoint of accumulating historical data Dh responsive to the current position Pc, the invention is not limited to this feature. For example, concerning the current position Pc for which historical data Dh already exists, such historical data Dh may be updated. In this case, for example, the current historical data Dh can be replaced with new historical data Ph. Alternatively, the reception sensitivity Sr that serves as historical data Dh may be classified into a plurality of sensitivity levels greater than two (for example, any number of levels from 3 to 16) and be stored on the basis of the levels, and the average value of the sensitivity levels may be used as an updated value.

According to the above-described embodiment, during times that the vehicle 14 is traveling (step S1 of FIG. 2: YES), the charging frequency fchg is updated (or stored) corresponding to the current position Pc (step S23 of FIG. 4). However, from the standpoint of it being acceptable if an appropriate charging frequency fchg can be used at a time that supply of power is started, the invention is not limited to this feature. For example, instead of steps S34 and S35 of the charging control (FIG. 5), by using the historical data Ph (for example, carrying out a process similar to that in step S23 of FIG. 4), the charging frequency fchg can be set or changed while taking into consideration the reception sensitivity Sr.

Further, from the standpoint of preventing interference from occurring between the charging frequency fchg or a higher harmonic component thereof and the radio frequency (AM frequency fam), instead of updating (or storing) the charging frequency fchg, a frequency range (use prohibition range) can also be set in which setting of the charging frequency fchg is prohibited. In addition, in the charging control, when the charging frequency fchg is calculated on the basis of the power supplying efficiency, the ECU 58 can change the charging frequency fchg in a manner so that the charging frequency fchg does not enter into the use prohibition range. Consequently, while considering the power supplying efficiency, the charging frequency fchg can be set responsive to the reception sensitivity Sr of the radio 64 at the current position Pc of the vehicle 14.

According to the above-described embodiment, historical data Dh is accumulated both in the case in which the reception sensitivity Sr is good and in the case in which the reception sensitivity Sr is poor (see FIGS. 3 and 4). However, insofar as attention is paid to only one of the case in which the reception sensitivity Sr is good or the case in which the reception sensitivity Sr is poor, the invention is not limited to this feature. For example, it is possible for the historical data Dh to be accumulated only in the case that the reception sensitivity Sr is good or only in the case that the reception sensitivity Sr is poor.

B4. Charging Control

According to the above-described embodiment, supply of power is enabled only in the case that the vehicle 14 is not currently traveling (step S1 of FIG. 2: NO). However, for example, from the standpoint of preventing interference from occurring between the charging frequency fchg or a higher harmonic component thereof and the radio frequency (AM frequency fam), the invention is not limited to this feature, and it is possible for supply of power to the vehicle 14 from the external power supplying device 12 to be performed while the vehicle 14 is currently traveling. In this case, the external power supplying device 12 is equipped with the power supplying circuit 24 along a path on which the vehicle 14 travels, and supply of power can be carried out while the vehicle 14 travels within a predetermined section or zone.

According to the above-described embodiment, a configuration or control has been described in which electrical power is supplied wirelessly with respect to the vehicle 14 from the external power supplying device 12 (see FIGS. 2 and 5). However, from the standpoint of avoiding interference from occurring between the charging frequency fchg or a higher harmonic component thereof and the radio frequency (AM frequency fam), the invention is not limited to this feature. For example, the invention can be applied to a configuration or a control for carrying out non-contact supply of power from the vehicle 14 with respect to the external power supplying device 12 (in this case, functioning as an external power receiving device).

According to the above-described embodiment, in the charging control, a determination is carried out as to whether it is possible to identify the current position Pc (step S32 of FIG. 5). However, for example, from the standpoint of reflecting in the charging frequency fchg the reception sensitivity Sr of radio waves (or the reception intensity of radio waves) at the current position Pc, the invention is not limited to this feature. For example, in the case that the vehicle 14 is currently traveling (or is traveling at a vehicle velocity V that is lower than the second vehicle velocity threshold), the charging frequency fchg can continue to be updated, and in the charging control (FIG. 5), it is possible for a newest charging frequency fchg to be used without identifying the current position Pc.

According to the above-described embodiment, historical data Dh is utilized (step S34, step S35) in the charging control (see FIG. 5). However, for example, at the time that charging is started, insofar as the charging frequency fchg can be set so as to prevent interference from occurring between the charging frequency fchg or a higher harmonic component thereof and the radio frequency (AM frequency fam), the invention is not limited to this feature. For example, steps S32 through S35 in FIG. 5 can be omitted. In this case, together with omitting FIGS. 3 and 4, in the case that an AM broadcast through the radio 64 is currently being listened to (step S31: YES), the process proceeds to step S36.

B5. Other Features

According to the above-described embodiment, the main part that carries out the accumulation of the historical data Dh (see FIGS. 3 and 4) and the charging control (see FIG. 5) is the ECU 58 of the vehicle 14. However, the invention is not limited to this feature, insofar as the charging frequency fchg can be set, for example, so as to prevent interference from occurring between the charging frequency fchg or a higher harmonic component thereof and the radio frequency (AM frequency fam).

For example, the accumulation of historical data Dh (steps S19 and S23 of FIG. 4) can be performed in a non-illustrated external server. In this case, the ECU 58 transmits the historical data Dh to the external server through the communications device 54. In the external server, the received historical data Dh is stored in a server storage unit (not shown). The external server may also accumulate, as a database, historical data Dh of a plurality of vehicles 14. In addition, in the charging control (FIG. 5), the ECU 58 of the vehicle 14 transmits the current position Pc to the external server, and receives, from the external server, historical data Dh corresponding to the current position Pc.

Alternatively, a portion of the charging control (FIG. 5) can also be carried out in the external power supplying device 12. Differently from the vehicle 14, the power supplying device 12 is fixed (the current position thereof does not change). Therefore, the power supplying device 12 acquires, from the external server, the historical data Dh (including updated data) corresponding to its own current position, and the historical data Dh may be used when the charging frequency fchg is set in supplying of electrical power to the vehicle 14. Further, in the case that an external server does not exist, a portion of the processing of FIG. 5 can also be carried out in the control device 28 of the power supplying device 12 instead of in the ECU 58.

What is claimed is:

1. A non-contact power supplied electric vehicle, comprising:
    an electrical storage device;
    a power receiving unit configured to receive electrical power for charging the electrical storage device, in a non-contact manner from an external power supplying device;
    a frequency adjusting unit configured to adjust a charging frequency during non-contact supply of power;
    a power supply control unit configured to control the non-contact supply of power;
    a radio; and
    a radio state determining unit configured to determine an operating state of the radio;
    wherein, when a request for starting non-contact supply of power is made, if it is determined that interference occurs between the charging frequency or a higher harmonic component thereof and a radio frequency, the frequency adjusting unit changes the charging frequency to a frequency that is capable of avoiding the interference; and
    the power supply control unit allows the non-contact supply of power to be started under a condition in which the charging frequency has been changed to the frequency that is capable of avoiding the interference.

2. The electric vehicle according to claim 1, further comprising a current position detecting unit configured to detect a current position of the electric vehicle;
    wherein the frequency adjusting unit:
    determines whether or not the radio frequency, which is received during a time that non-contact supply of power is not implemented, including during a time of traveling of the electric vehicle, resides within a band in which the charging frequency is changed; and
    if the radio frequency is determined to reside within the band, stores, in a storage unit, storage information including the radio frequency and the current position, and when the storage information exists at a time that a request for starting non-contact supply of power is made, sets the charging frequency, based on the storage information.

3. The electric vehicle according to claim 1, wherein the frequency adjusting unit changes the charging frequency only if the radio is in an on state and if it is determined that interference occurs between the charging frequency or a higher harmonic component thereof and the radio frequency.

4. The electric vehicle according to claim 1, wherein the frequency adjusting unit changes the charging frequency to the frequency that is capable of avoiding the interference, only in a case that a reception intensity of radio waves received by a receiver of the radio is higher than a predetermined threshold.

5. A non-contact power supplying method for carry out supply of electrical power in a non-contact manner between an external device and an electric vehicle having a radio, comprising the steps of:
    when a request for starting non-contact supply of power is made, in the electric vehicle or the external device, determining whether or not interference occurs mutually between a charging frequency or a higher harmonic component thereof and a radio frequency, based on the charging frequency and the radio frequency;
    if it is determined that the interference occurs, in the electric vehicle or the external device, changing the charging frequency to a frequency that is capable of avoiding the interference; and
    in the electric vehicle or the external device, starting non-contact supply of power, under a condition in which the charging frequency has been changed to the frequency that is capable of avoiding the interference.

* * * * *